(12) United States Patent
Hung

(10) Patent No.: US 7,566,178 B2
(45) Date of Patent: Jul. 28, 2009

(54) DUSTPROOF STRUCTURE ADAPTED TO AN IMAGE-CAPTURING DEVICE

(75) Inventor: Chun-Hui Hung, Taipei (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 428 days.

(21) Appl. No.: 11/603,982

(22) Filed: Nov. 24, 2006

(65) Prior Publication Data
US 2007/0122147 A1    May 31, 2007

(30) Foreign Application Priority Data
Nov. 29, 2005    (TW) ............................... 94220729 U

(51) Int. Cl.
*G03B 17/00*    (2006.01)
(52) U.S. Cl. .................. 396/448; 396/348; 359/511
(58) Field of Classification Search ............. 396/25–29, 396/448; 359/507, 511, 513
See application file for complete search history.

(56) References Cited

U.S. PATENT DOCUMENTS 5,335,028 A * 8/1994 Kosako .................. 396/29
6,038,087 A * 3/2000 Suzuki et al. ............... 359/819
2001/0048557 A1* 12/2001 Akami et al. ............... 359/513
2006/0098975 A1* 5/2006 Kobayashi .................. 396/448

* cited by examiner

Primary Examiner—Patrick J Assouad
Assistant Examiner—Leon W Rhodes

(57) ABSTRACT

A dustproof structure adapted to an image-capturing device, includes a dustproof cover body, two movable dustproof vanes, a rotating element, and a bottom seat. The dustproof cover body has a first through hole. Two corresponding movable dustproof vanes movably pivot in the dustproof cover body. The rotating element movably disposes on the two movable dustproof vanes, and the rotating element has a second through hole corresponding to the first through hole and a plurality of support ribs formed on two side faces thereof. The bottom seat is fixed on a bottom side of the dustproof cover body for preventing the rotating element from being moved longitudinally, and the bottom seat has a third through hole corresponding to the first and second through holes. The rotating element is moved transversely in a predetermined range between the two movable dustproof vanes and the bottom seat via a part of the support ribs.

6 Claims, 3 Drawing Sheets

DUSTPROOF STRUCTURE ADAPTED TO AN IMAGE-CAPTURING DEVICE

BACKGROUND OF THE INVENTION

1. Field of the Invention

The present invention relates to a dustproof structure adapted to an image-capturing device, and particularly relates to a rotating element that is moved transversely in a predetermined range between a pair of movable dustproof vanes and a bottom seat via a part of a support rib for preventing sand grains from being jammed between relevant movable mechanisms.

2. Description of the Related Art

In general, when sand grains enter the lens of a camera, the sand grains become jammed between the relevant movable mechanisms such as the movable vanes or the camera shutter. Hence, the mechanisms will lose their ability to move properly and become jammed due to the sand grains.

SUMMARY OF THE INVENTION

The present invention provides a dustproof structure adapted to an image-capturing device. In the present invention, a rotating element is moved transversely in a predetermined range between a pair of movable dustproof vanes and a bottom seat via a part (small surface) of a support rib (in the prior art being via all surface of the support rib) for preventing sand grains from becoming jammed between the rotating element and the pair of movable dustproof vanes (or the bottom seat), or between any relevant movable mechanisms, especially the camera shutter.

In other words, the present invention ensures that when the pair of movable dustproof vanes is opened or closed and sand grains enter a lens module of the image-capturing device through the pair of movable dustproof vanes, the rotating element is normally moved among the pair of movable dustproof vanes and the bottom seat. Hence, the present invention prevents sand grains from entering into the lens module and prevents sand grains from becoming jammed between the rotating element and the pair of movable dustproof vanes (or the bottom seat). Hence, the relevant mechanisms in the lens module will maintain normal operation.

One aspect of the present invention is a dustproof structure adapted to an image-capturing device, comprising: a dustproof cover body, two movable dustproof vanes, a rotating element, and a bottom seat. The dustproof cover body has a first through hole. The two movable dustproof vanes correspond to each other and are movably pivoted in the dustproof cover body. The rotating element is movably disposed on the two movable dustproof vanes, and the rotating element has a second through hole corresponding to the first through hole and a plurality of a support ribs formed on both side faces thereof. The bottom seat is fixed on a bottom side of the dustproof cover body for preventing the rotating element from being moved longitudinally, and the bottom seat has a third through hole corresponding to the first and the second through holes. In addition, the rotating element is moved transversely in a predetermined range among the two movable dustproof vanes and the bottom seat via a part of the support ribs.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED BEST MOLDS

Figure 1:
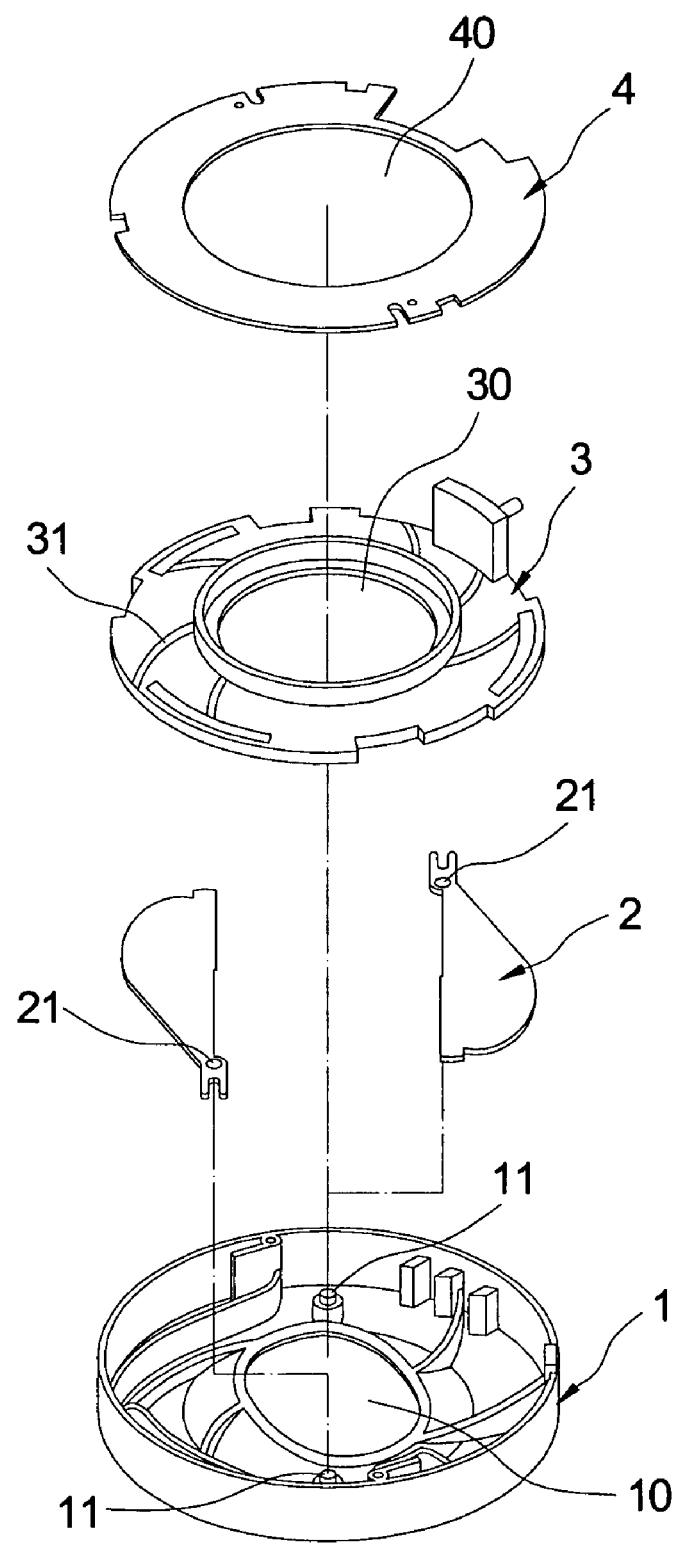
FIG. 1 is a schematic, exposed view of a dustproof structure adapted to an image-capturing device according to the present invention.
Figure 2:
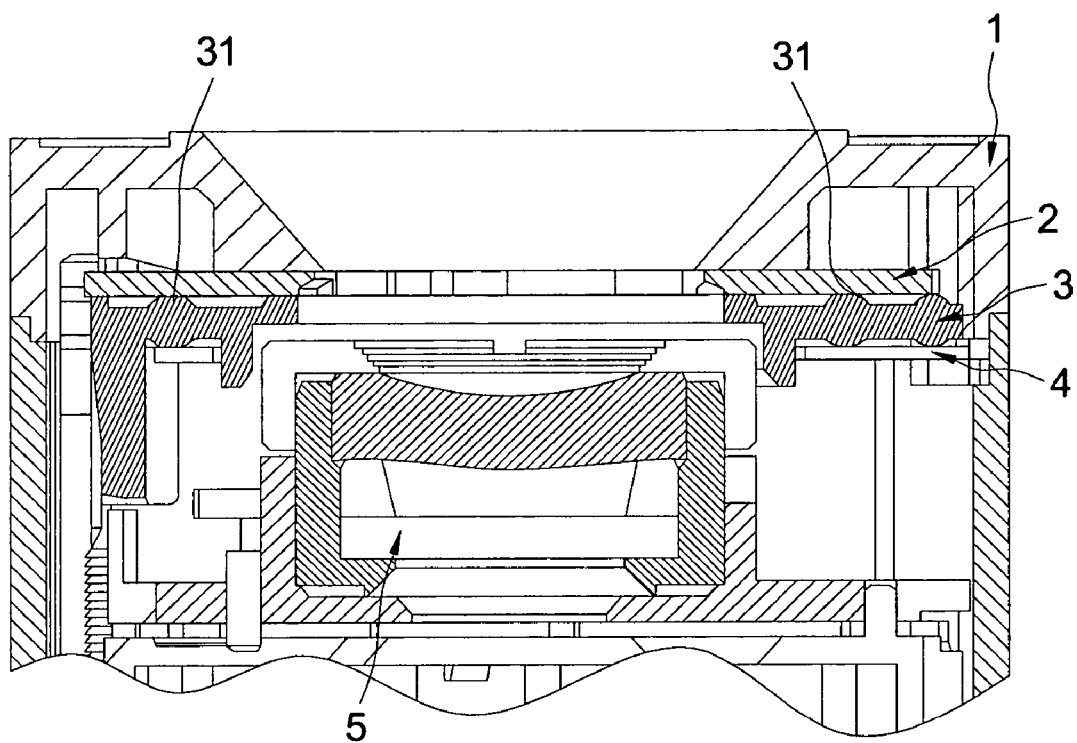
FIG. 2 is a schematic, cross-sectional view of a dustproof structure adapted to an image-capturing device according to the present invention.

Referring to FIGS. 1 and 2, the present invention provides a dustproof structure adapted to an image-capturing device, comprising: a dustproof cover body 1, two movable dustproof vanes 2, a rotating element 3, and a bottom seat 4.

The dustproof cover body 1 has a first through hole 10. The two movable dustproof vanes 2 correspond to each other and are respectively movably pivoted on two pivot axles 11 of the dustproof cover body 1 via two pivot holes 21. In addition, the rotating element 3 is movably disposed on the two movable dustproof vanes 2. The rotating element 3 has a second through hole 30 corresponding to the first through hole 10 and a plurality of support ribs 31 formed on both side faces thereof.

Moreover, the bottom seat 4 is fixed on a bottom side of the dustproof cover body 1 for preventing the rotating element 3 from being moved longitudinally and allowing the rotating element 3 to rotate transversely. The bottom seat 4 has a third through hole 40 corresponding to the first through holes 10 and the second through hole 30. Hence, the two movable dustproof vanes 2 are driven to expose or shade the first, the second, and the third through holes 10, 30, 40 via the rotating element 3 in order to choose whether to expose a lens module 5 of the image-capturing device.

Figure 3:
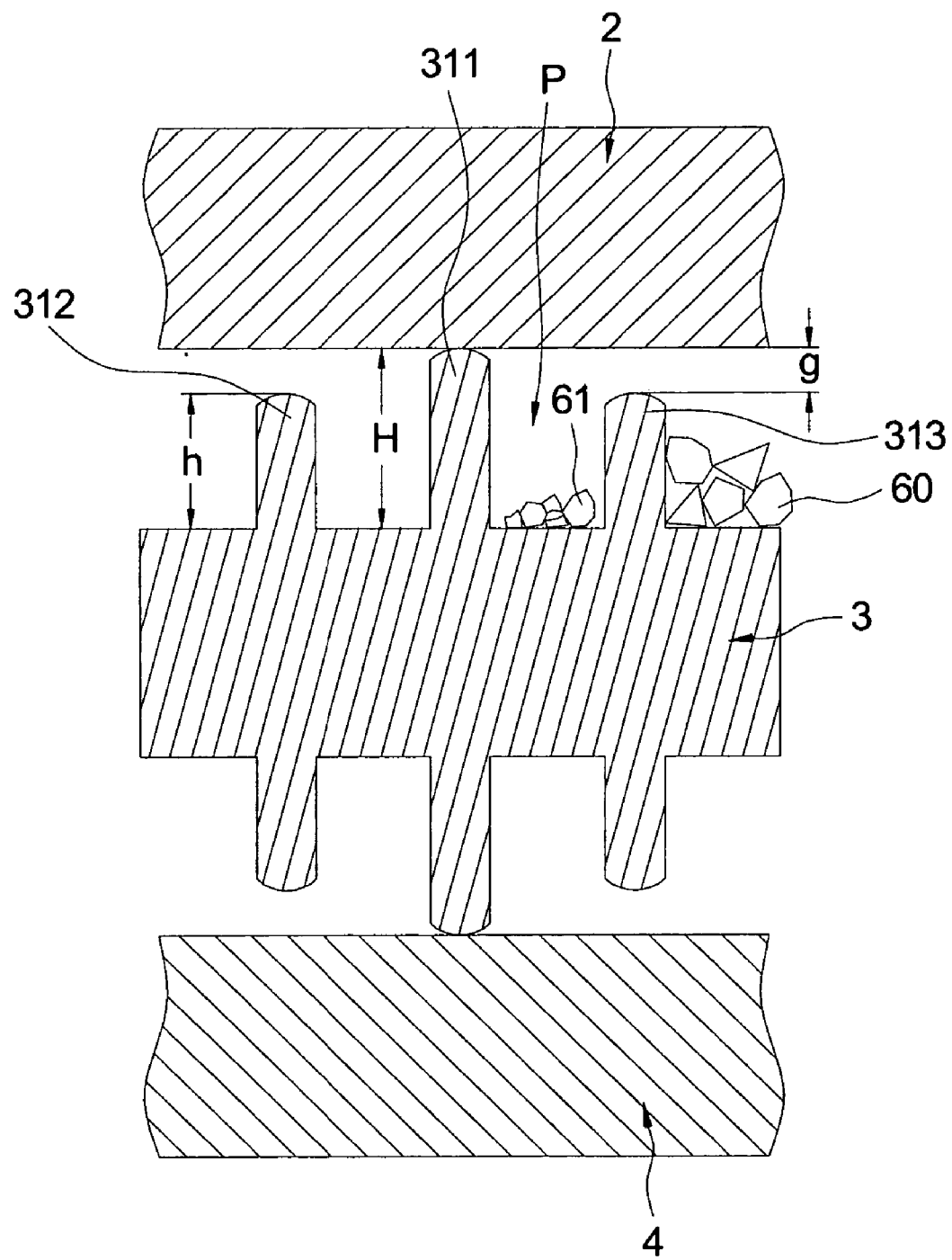
FIG. 3 is a schematic view showing a relation among a movable dustproof vane, three support ribs and a bottom seat according to the present invention.

Referring to FIG. 3, the support ribs 31 are divided into many support rib sets, and each support rib set has three support ribs 31 formed on two outside annular areas of both side faces of the rotating element 3. In addition, each support rib set has a middle support rib 311 and two lateral support ribs 312, 313 respectively formed beside both sides of the middle support rib 311. The height H of the middle support rib 311 is larger than the height h of the two lateral support ribs.

Each middle support rib 311 is compactly contacted among the two movable dustproof vanes 2 and the bottom seat 4. In other words, the rotating element 3 is moved transversely in a predetermined range among the two movable dustproof vanes 2 and the bottom seat 4 via each middle support rib 311. Moreover, the dustproof structure further comprises a predetermined gap g formed between the movable dustproof vane 2 and the lateral support rib 312 or 313, and between the bottom seat 4 and the lateral support rib 312 or 313 for filtering out sand grains 60. In other words, the sand grains 60 that are larger than the gap g are stopped outside, and the sand grains 61 that are smaller than the gap g enter a space P through the gap g. However, the sand grains 61 do not affect the rotation and the sliding action between the movable dustproof vane 2 and the middle support rib 311 as shown in FIG. 3. Hence, the rotating element 3 is moved transversely in the predetermined range among the two movable dustproof vanes 2 and the bottom seat 4 via a part of the support ribs such as the middle support rib 311 of FIG. 3.

In conclusion, in the present invention the rotating element 3 is moved transversely in the predetermined range between the pair of movable dustproof vanes 2 and the bottom seat 4 via the part (small surface) of the support rib 31 (in the prior being via all surface of the support rib) for preventing sand grains 60 from becoming jammed between the rotating element 3 and the pair of movable dustproof vanes 2 (or the bottom seat 4), or between any relevant movable mechanisms, especially the camera shutter.

The present invention ensures that when the pair of movable dustproof vanes 2 is opened or closed and the sand grains 60, 61 enter the lens module 5 of the image-capturing device through the pair of movable dustproof vanes 2, the rotating element 3 is normally moved among the pair of movable dustproof vanes 2 and the bottom seat 4. Hence, the present invention prevents sand grains 60, 61 from entering into the lens module 5 and prevents sand grains 60, 61 from being jammed between the rotating element 3 and the pair of movable dustproof vanes 2 (or the bottom seat 4). Hence, the relevant mechanisms in the lens module 5 will maintain normal operation. For example: when a user goes to the beach and sand grains enter the camera or the camera drops into sand, the user only needs to clean the outside sand grains off the camera. The camera can still be used normally and no extra cleaning operations are necessary.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A dustproof structure adapted to an image-capturing device, comprising:
    a dustproof cover body having a first through hole;
    two movable dustproof vanes corresponding to each other and movably pivoted in the dustproof cover body;
    a rotating element movably disposed on the two movable dustproof vanes, wherein the rotating element has a second through hole corresponding to the first through hole and a plurality of support ribs formed on both side faces thereof; and
    a bottom seat fixed on a bottom side of the dustproof cover body for preventing the rotating element from be moved longitudinally, wherein the bottom seat has a third through hole corresponding to the first and the second through holes;
    wherein, the rotating element is moved transversely in a predetermined range among the two movable dustproof vanes and the bottom seat via a part of the support ribs.

2. The dustproof structure as claimed in claim 1, wherein the two movable dustproof vanes are driven to expose or shade the first, the second, and the third through holes via the rotating element.

3. The dustproof structure as claimed in claim 1, wherein the support ribs are divided into many support rib sets, and each support rib set has three support ribs formed on two outside annular areas of both side faces of the rotating element; wherein each support rib set has a middle support rib and two lateral support ribs respectively formed beside both sides of the middle support rib, and the middle support rib has a height larger than that of the two lateral support ribs.

4. The dustproof structure as claimed in claim 3, wherein each middle support rib is compactly contacted among the two movable dustproof vanes and the bottom seat.

5. The dustproof structure as claimed in claim 3, further comprising a predetermined gap formed between the movable dustproof vane and the lateral support rib, and between the bottom seat and the lateral support rib.

6. The dustproof structure as claimed in claim 3, wherein the rotating element is moved transversely in the predetermined range among the two movable dustproof vanes and the bottom seat via each middle support rib.

\* \* \* \* \*